US010361895B1

(12) United States Patent
Hu

(10) Patent No.: US 10,361,895 B1
(45) Date of Patent: Jul. 23, 2019

(54) SYSTEMS AND METHODS FOR HYBRID MULTI-LAYER SIGNAL DECOMPOSITION

(71) Applicant: Lan Hu, Ottawa (CA)

(72) Inventor: Lan Hu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/876,950

(22) Filed: Jan. 22, 2018

(51) Int. Cl.
  *H04L 27/26* (2006.01)
  *H04J 13/00* (2011.01)
  *H04B 1/7105* (2011.01)

(52) U.S. Cl.
  CPC ..... *H04L 27/2614* (2013.01); *H04B 1/71052* (2013.01); *H04J 13/0007* (2013.01); *H04B 2201/70706* (2013.01); *H04J 2013/0037* (2013.01)

(58) Field of Classification Search
  CPC ............ H04L 27/2614; H04B 1/71052; H04B 2201/70706; H04J 13/0007; H04J 2013/0037
  See application file for complete search history.

(56) References Cited

U.S. PATENT DOCUMENTS 8,026,764 B2 * 9/2011 Sorrells ..................... H03F 1/32
  330/124 R
2009/0117863 A1 * 5/2009 Birafane ............... H03F 1/0205
  455/108
2010/0149039 A1 * 6/2010 Komijani ............. H04B 7/0617
  342/377
2014/0266464 A1 9/2014 Ma et al.

FOREIGN PATENT DOCUMENTS

CN  106102156 A  11/2016

OTHER PUBLICATIONS

3GPP TSG RAN WG1 Meeting #83, R1-156926, Neul, Huawei, Hisilicon, On GMSK/PSK modulation for uplink. Anaheim, USA, Nov. 15-22, 2015. 8 pages.

* cited by examiner

*Primary Examiner* — Thai Nguyen

(57) ABSTRACT

A hybrid multi-layer method for decomposing of a source signal to a plurality of decomposed signals that can be used to collectively represent the source signal or recover the source signal. An example embodiment is a method that includes multi-layer (or multi-stage) signal decomposition to generate constant envelope signals without impact on the original signal. In an example embodiment, the method includes signal decomposition to maintain constant envelope properties and limit bandwidth expansion from the signal decomposition. The method includes decomposing a source signal into two first-stage decomposed signals that each have a constant envelope amplitude value. The method further includes iteratively decomposing each of the constant envelope signals into further-stage decomposed signals based on a threshold amplitude value at each iteration. The further-stage decomposed signals have a constant envelope with an envelope amplitude value in dependence of the threshold amplitude value at each iteration.

28 Claims, 14 Drawing Sheets

SYSTEMS AND METHODS FOR HYBRID MULTI-LAYER SIGNAL DECOMPOSITION

TECHNICAL FIELD

Example embodiments generally relate to the technical field of communications and signal processing, and in particular to methods and systems for signal decomposition.

BACKGROUND

Signal decomposition generally refers to the conversion of a source signal to a plurality of decomposed signals that collectively represent the original source signal. For example, the plurality of decomposed signals can contain useful individual information of the source signal, can be individually processed, or can be recomposed back to the original source signal.

Recent wireless standards such as proposed 5th Generation (5G) communication standard are intended to improve communications, for example in order to achieve higher capacity. Implementation of some aspects of 5G systems may result in high dynamic signal amplitudes with high Peak-to-Average Power Ratio (PAPR) waveforms. Higher PAPR signal conditions generally require greater number of bits to represent the signal, which can also be referred to as bit resolution or bit quantization. Higher PAPR signal conditions can generally result in lower power efficiency, which is generally not desired. Higher PAPR signal conditions may be beyond the efficient dynamic range of some subsystems.

Some existing systems perform decomposition of a signal, but these systems may have wide signal bandwidth and high PAPR. A difficulty with some existing signal decomposition systems is that they may suffer bandwidth expansion, for example.

A difficulty with some subsystems that may be used in signal decomposition systems is that they may have a limited dynamic range of operation.

It is desired to provide systems and methods for signal decomposition of a source signal into decomposed signals that have reduced PAPR, have higher power efficiency, require less quantization bits, and have a constrained bandwidth.

This background information is provided to reveal information believed by the applicant to be of possible relevance. No admission is necessarily intended, nor should be construed, that any of the preceding information constitutes prior art.

SUMMARY

A hybrid multi-layer (or multi-stage) decomposition method can be used to decompose a source signal into a plurality of decomposed signals that can be used to collectively represent the source signal or recover the source signal. The decomposed signals have a lower Peak-to-Average Power Ratio (PAPR) than the source signal, and can generally require less quantization bits to represent each of the decomposed signals. An example embodiment of the method includes multi-layer signal decomposition to enable generating constant envelope signals without impact on or with minimal impact on the original signal.

In an example embodiment, the method includes decomposing a source signal into two first-stage decomposed signals that each have a constant envelope amplitude value that is half of the maximum amplitude value of the source signal. The method further includes iteratively decomposing each of the first-stage decomposed signals into further-stage decomposed signals based on a threshold amplitude value at each iteration. The further-stage decomposed signals each have one or more constant envelopes that have a constant envelope amplitude value that depends on the threshold amplitude value. The decomposed signals that are output at each stage have constant envelope properties.

An object of at least some example embodiments is to provide a method and system for multi-layer signal decomposition that maintains constant envelope properties at each layer and limits bandwidth expansion from signal decomposition.

An object of at least some example embodiments is to reduce PAPR using signal decomposition with reduced Error Vector Magnitude (EVM) when compared to other existing decomposition methods.

An object of at least some example embodiments is to maintain a constant amplitude envelope at each layer of the multi-layer signal decomposition, without impact on or with minimal impact on the recoverability of the original source signal.

An object of at least some example embodiments is to limit an input amplitude range to subsystems that may perform better with processing of a limited amplitude range of a received input signal.

An example embodiment is method for decomposition of a source signal, the method comprising: decomposing the source signal into two first-stage decomposed signals that each have a constant envelope amplitude value that is half of a maximum amplitude value of the source signal; and decomposing each of the first-stage decomposed signals into a first second-stage decomposed signal and a second second-stage decomposed signal that each have a constant envelope, a constant envelope amplitude value of the first second-stage decomposed signal being equal to a threshold amplitude value, a constant envelope amplitude value of the second second-stage decomposed signal being equal to the constant envelope amplitude value of one of the first-stage decomposed signals minus the threshold amplitude value.

In an example embodiment of the method, the threshold amplitude value is a predefined value.

In an example embodiment of any of the above methods, the threshold amplitude value is half of the maximum amplitude value of any one of the two first-stage decomposed signals.

In an example embodiment of any of the above methods, the source signal is represented as x(k) for each sample value k, wherein the two first-stage decomposed signals are:

$$x_{11}(k) = \frac{A_m}{2} e^{j\phi(k)} e^{j\theta(k)},$$

and $$x_{12}(k) = \frac{A_m}{2} e^{-j\phi(k)} e^{j\theta(k)};$$

wherein $A_m$ is the maximum amplitude value of the source signal, $\Phi(k)$ and $\theta(k)$ are functions of k, and j is a unit imaginary number.

In an example embodiment of any of the above methods, the two first-stage decomposed signals are:

$$x_{11}(k) = \frac{x(k) + e(k)}{2},$$

-continued and $$x_{12}(k) = \frac{x(k) - e(k)}{2};$$

wherein the source signal is represented as x(k) for each sample value k, and e(k) is an error function.

In an example embodiment of any of the above methods, the first second-stage decomposed signal and the second second-stage decomposed signal are:

$$x_1(k) = \begin{cases} 0 & |x(k)| < d \\ \frac{x(k)}{|x(k)|} \times d & d \leq |x(k)| \end{cases},$$

and $$x_2(k) = \begin{cases} x(k) & |x(k)| < d \\ \left(1 - \frac{d}{|x(k)|}\right) \times x(k) & d \leq |x(k)| \end{cases};$$

wherein the source signal is represented as x(k) for each sample value k, and d is the threshold amplitude value.

In an example embodiment of any of the above methods, d is half of the maximum amplitude value of one of the two constant first-stage decomposed signals, wherein the first second-stage decomposed signal and the second second-stage decomposed signal that are decomposed from one of the two first-stage decomposed signals are:

$$x_{21\_1}(k) = \begin{cases} 0 & |x(k)| < d \\ \frac{A_m}{2} e^{j\phi(k)} e^{j\theta(k)} & d \leq |x(k)| \end{cases},$$

and $$x_{21\_2}(k) = \begin{cases} \frac{A_m}{2} e^{j\phi(k)} e^{j\theta(k)} & |x(k)| < d \\ 0 & d \leq |x(k)| \end{cases}.$$

In an example embodiment of any of the above methods, the source signal is represented as x(k) for each sample value k, wherein the first second-stage decomposed signal and the second second-stage decomposed signal that are decomposed from one of the two first-stage decomposed signals are:

$$x_{21\_1}(k) = \begin{cases} 0 & |x(k)| < d \\ d \times e^{j\phi(k)} e^{j\theta(k)} & d \leq |x(k)| \end{cases},$$

and $$x_{21\_2}(k) = \begin{cases} \frac{A_m}{2} e^{j\phi(k)} e^{j\theta(k)} & |x(k)| < d \\ \left(\frac{A_m}{2} - d\right) \times e^{j\phi(k)} e^{j\theta(k)} & d \leq |x(k)| \end{cases};$$

wherein d is the threshold amplitude value, $A_m$ is the maximum amplitude value of the source signal, $\Phi$ and $\theta$ are functions of k, and j is a unit imaginary number.

In an example embodiment of any of the above methods, the method further comprises iteratively performing at least one further stage of decomposition, on each of the second-stage decomposed signals as input signals, as follows: determining a threshold amplitude value for a present stage of decomposition, and decomposing the input signal into first and second present-stage decomposed signals that each have a constant envelope, a constant envelope amplitude value of the first output signal being equal to the threshold amplitude value for the present stage of decomposition, a constant envelope amplitude value of the second output signal being equal to the constant envelope amplitude value of the input signal minus the threshold amplitude value for the present stage of decomposition.

In an example embodiment of any of the above methods, the method further comprises determining that the constant envelope amplitude value of any one of the output signals has attained a predetermined value, and in response to said determining ending the iteratively performing.

In an example embodiment of any of the above methods, the iteratively performing is ended when the constant envelope amplitude value of all of the output signals have attained the predetermined value.

In an example embodiment of any of the above methods, the method further comprises determining that a predetermined number of stages of decomposition have been performed by the iteratively performing, and in response to said determining ending the iteratively performing.

In an example embodiment of any of the above methods, the method further comprises determining that a predetermined time period has passed, and in response to said determining ending the iteratively performing.

In an example embodiment of any of the above methods, the threshold amplitude value for each stage of decomposition is half of a constant envelope amplitude envelope value of one of the input signals.

In an example embodiment of any of the above methods, the threshold amplitude value for each stage of decomposition is less than a constant envelope amplitude envelope value of one of the input signals.

In an example embodiment of any of the above methods, the method further comprises filtering, using at least one filter, each of the second-stage decomposed signals.

In an example embodiment of any of the above methods, at least one filter comprises at least one low pass filter or at least one band pass filter.

In an example embodiment of any of the above methods, the method further comprises sending each of the second-stage decomposed signals to at least one subsystem, the at least one subsystem comprising a power amplifier, a Digital-To-Analog Converter (DAC), a transmitter, or a transmission line.

In an example embodiment of any of the above methods, the method further comprises storing the further constant envelope signals to a memory.

In an example embodiment of any of the above methods, the threshold amplitude value is less than the maximum amplitude value of the two first-stage decomposed signals.

Another example embodiment is a method for decomposition of a source signal, the method comprising: decomposing the source signal into two first-stage decomposed signals that each have a constant envelope amplitude value that is half of a maximum amplitude value of the source signal; and decomposing each of the two first-stage decomposed signals into a second-stage decomposed signal that has a constant envelope, a constant envelope amplitude value of the second-stage decomposed signal being equal to half of the maximum amplitude value of one of the first-stage decomposed signals, the source signal being recoverable from the second-stage decomposed signals.

In an example embodiment of any of the above methods, the source signal is represented as x(k) for each sample value k, wherein the second-stage decomposed signal from one of the first-stage decomposed signals is:

$$x_{21\_1}(k) = \begin{cases} 0 & |x(k)| < d \\ \frac{A_m}{2} e^{j\phi(k)} e^{j\theta(k)} & d \leq |x(k)| \end{cases},$$

and $$x_{21\_2}(k) = \begin{cases} \frac{A_m}{2} e^{j\phi(k)} e^{j\theta(k)} & |x(k)| < d \\ 0 & d \leq |x(k)| \end{cases};$$

wherein $A_m$ is the maximum amplitude value of the source signal, $\Phi$ and $\theta$ are functions of k, and j is a unit imaginary number.

In an example embodiment of any of the above methods, the source signal is represented as x(k) for each sample value k, wherein the two first-stage decomposed signals are:

$$x_{11}(k) = \frac{A_m}{2} e^{j\phi(k)} e^{j\theta(k)},$$

and $$x_{12}(k) = \frac{A_m}{2} e^{-j\phi(k)} e^{j\theta(k)};$$

wherein $A_m$ is the maximum amplitude value of the source signal, $\Phi$ and $\theta$ are functions of k, and j is a unit imaginary number.

In an example embodiment of any of the above methods, the method further comprises storing each second-stage decomposed signal to a memory.

In an example embodiment of any of the above methods, each of the two first-stage decomposed signals are decomposed into only one respective second-stage decomposed signal.

Another example embodiment is a device for decomposition of a source signal, the device comprising: at least one controller configured to: decompose the source signal into two first-stage decomposed signals that each have a constant envelope amplitude value that is half of a maximum amplitude value of the source signal, and decompose each of the first-stage decomposed signals into a first second-stage decomposed signal and a second second-stage decomposed signal that each have a constant envelope, a constant envelope amplitude value of the first second-stage decomposed signal being equal to a threshold amplitude value, a constant envelope amplitude value of the second second-stage decomposed signal being equal to the constant envelope amplitude value of one of the first-stage decomposed signals minus the threshold amplitude value.

In an example embodiment of the device, the device further comprises a receiver for receiving the source signal.

Another example embodiment is a non-transitory computer readable medium containing instructions for decomposition of a source signal, the non-transitory computer readable medium comprising instructions executable by a processor of a communication device, the instructions comprising: instructions for decomposing the source signal into two first-stage decomposed signals that each have a constant envelope amplitude value that is half of a maximum amplitude value of the source signal; and instructions for decomposing each of the first-stage decomposed signals into a first second-stage decomposed signal and a second second-stage decomposed signal that each have a constant envelope, a constant envelope amplitude value of the first second-stage decomposed signal being equal to a threshold amplitude value, a constant envelope amplitude value of the second second-stage decomposed signal being equal to the constant envelope amplitude value of one of the first-stage decomposed signals minus the threshold amplitude value.

BRIEF DESCRIPTION OF THE FIGURES

Embodiments will now be described by way of examples with reference to the accompanying drawings, in which like reference numerals may be used to indicate similar features, and in which.

DETAILED DESCRIPTION OF EXAMPLE EMBODIMENTS

Example embodiments are generally directed to methods and systems for signal decomposition. The system includes a decomposition architecture that provides flexibility for system architecture design.

In an example embodiment, the method includes multi-layer signal decomposition to enable generating constant envelope signals without impact or with minimal impact on recoverability of the original source signal.

In an example embodiment, the method includes multi-layer decomposition to reduce PAPR and the number of quantization bits. For a first layer or stage of the decomposition, the method includes decomposing a source signal into two signals that each have a constant envelope amplitude value that is half of a maximum amplitude value of the source signal. For higher layers of the decomposition, a threshold decomposition algorithm is used, wherein a target amplitude threshold can be used to further reduce the dynamic range of the constant envelope signals.

Because the decomposed signals have confined bandwidth properties, the method can include filtering of the decomposed signals to remove higher frequencies and maintain a majority of the original signal.

Figure 1:
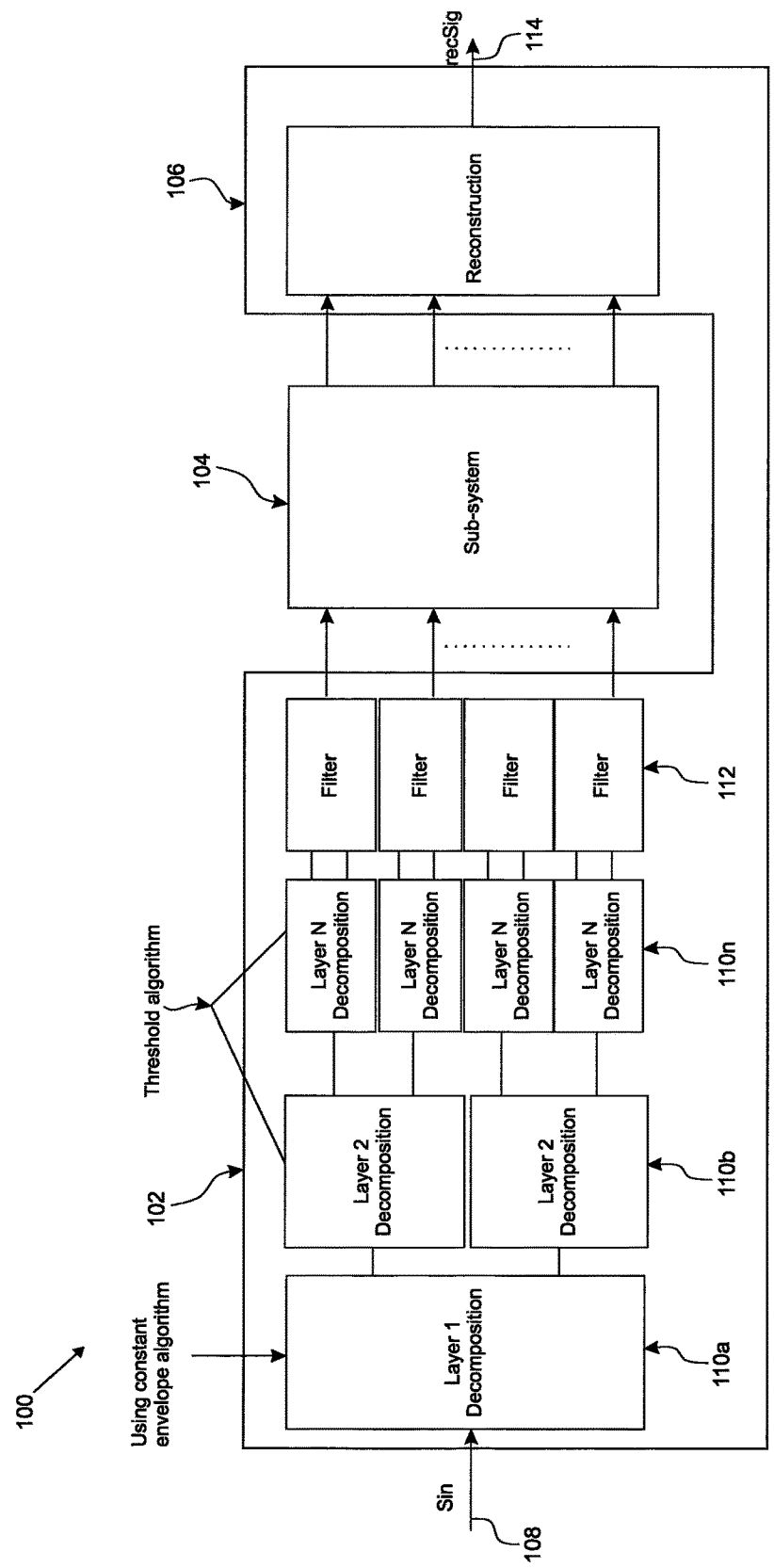
FIG. 1 illustrates in block diagram form a signal processing system in accordance with an example embodiment, that includes a multi-layer signal decomposition module.

Reference is now made to FIG. 1, which illustrates a signal processing system 100 in accordance with an example embodiment. The system 100 includes a multi-layer signal decomposition module 102, one or more subsystems 104, and a reconstruction module 106. The decomposition module 102 is configured to receive and process an original input signal (Source Signal 'Sin') 108. The decomposition module 102 includes a plurality of decomposition layers 110a, 110b, . . . , 110n (individually or collectively '110'), also referred to herein as stages, that are configured to collectively perform multi-layer signal decomposition as described in greater detail herein, resulting in a plurality of decomposed signals that are decomposed from the original input signal 108. One or more filters 112 can be used to filter each of the plurality of decomposed signals. The one or more subsystems 104 can perform further functions on the filtered decomposed signals. In an example embodiment, the reconstruction module 106 is configured to reconstruct or re-compose the received signals from the one or more subsystems 104, for example by adding the received signals together or by performing the functions of the decomposition module 102 in reverse. A recovered signal 114 therefore results from the reconstruction module 106.

Referring to the multi-layer decomposition module 102, in an example embodiment, the first layer 110a (also known as Layer 1 or Stage 1) is based on a constant envelope algorithm and higher layers are based on a threshold algorithm that uses a threshold amplitude for further decomposing of the signal. For example, the second layer 110b (also known as Layer 2 or Stage 2) to the nth layer 110n (also known as Layer n or Stage n) are based on the threshold algorithm that maintains constant envelope properties, described in greater detail herein.

In an example embodiment, due the bandwidth confinement resulting from the constant envelope at each layer 110, the one or more filters 112 can further be used to filter specified bandwidths. In an example embodiment, the one or more filters 112 comprise low pass filters or band pass filters or both. In an example embodiment, a respective filter 112 is used for each of the finally decomposed signals. In another example embodiment, the same filter 112 is used for each of the finally decomposed signals.

Example embodiments of the one or more subsystems 104 are a power amplifier, a Digital-to-Analog Converter (DAC), a transmitter, a transmission line, etc. At least one of the subsystems 104 may have a limited dynamic range of operation and better performance within that range of operation. Not all of the decomposed signals necessarily need to be sent to the one or more subsystems 104.

In an example embodiment, the system 100 is resident on one device or apparatus. In another example, the system 100 is implemented by two or more devices or apparatuses. For example, the reconstruction module 106 may be resident on a different device than the decomposition module 102.

In an example embodiment, the original input signal 108 is received by the system 100 using a receiver of a communication subsystem, for example from direct transmission or via a wired or wireless network. In another example embodiment, the original input signal 108 is generated by the system 100 itself. Similarly, in example embodiments, the recovered signal 114 can be used by the system 100 itself for further processing or storing to memory, or can be transmitted to another device or network.

In an example embodiment, as shown in FIG. 1, each module of each of the layers 110 results in a maximum of two outputs or branches. In another example embodiment, described in greater detail herein, for the higher layers 110b to 110n, only a first branch of the two branches is required to be determined for each module, with the second branch not required to be determined or stored due to its identical properties or recoverability from the respective first branch. For example, only the determined signal of the first branch of these layers is stored to a memory. Therefore, the second branch is optionally never determined or not stored to the memory.

Referring to FIG. 1, the first layer 110a will be described in greater detail, in accordance with an example embodiment. The first layer 110a is a constant envelope algorithm. The first layer 110a output is a decomposition of the input signal 108 into two constant envelope signals.

In general, the input signal 108 can be defined:

$$x(k)=|x(k)|e^{j\Theta(k)} \quad (1.1)$$

In equation (1.1), $|x(k)|$ is the amplitude of the original signal. k is the sample value. j is the unit imaginary number.

An intermediate signal is introduced as follows:

$$\cos\phi(k) = \frac{|x(k)|}{A_m}$$

In the intermediate signal, $A_m$ is the maximum amplitude value of the signal 108. $\Phi(k)$ is a function of k.

The original signal 108 can be re-written as:

$$x(k)=A_m \cos \Phi(k)e^{j\Theta(k)}$$

In this equation, $\theta(k)$ is a function of k. The original signal 108 can be re-arranged as:

$$x(k) = A_m \frac{e^{j\phi(k)} + e^{-j\phi(k)}}{2} e^{j\theta(k)} \quad (1.2)$$

Hence, the original signal can be decomposed into two constant envelope signals:

$$x(k)=x_{11}(k)+x_{12}(k) \quad (1.3)$$

For equation (1.3), the two constant envelope signals are:

$$x_{11}(k) = \frac{A_m}{2}e^{j\phi(k)}e^{j\theta(k)} \quad (1.4)$$

and $$x_{12}(k) = \frac{A_m}{2} e^{-j\phi(k)} e^{j\theta(k)} \quad (1.5)$$

As would be apparent to a person skilled in the art, the respective signals defined by both of (1.4) and (1.5) each have constant envelope with a constant envelope amplitude value equal to $A_m/2$.

In another example implementation of the signals of (1.4) and (1.5), it is possible to rearrange these signals to the following:

$$x_{11}(k) = \frac{x(k) + e(k)}{2} \quad (1.6)$$

and $$x_{12}(k) = \frac{x(k) - e(k)}{2} \quad (1.7)$$

In equations (1.6) and (1.7), e(k) is an error function defined by:

$$e(k) = j \times x(k) \sqrt{\left(\frac{1}{\cos(\phi(k))}\right)^2 - 1} \quad (1.8)$$

In equation (1.8), cos Φ(k) has been defined above.

Subsequent signal composition of the decomposed signals would involve adding of the signals of equations (1.6) and (1.7). This results in the positive and negative error function values being canceled out when added together. Because the error function will be cancelled at the signal composition stage, the presence of the error function only impacts on the dynamic range of the signal envelope, and will not impact on the finally combined signal result.

Note that Equations (1.6) and (1.7) can be simplified in that e(k) is not required to be calculated as an exact value, but rather can be estimated. As an example, the COordinate Rotation DIgital Computer (CORDIC) algorithm can be used for the estimation of the error function, as understood in the art.

Replace equation (1.8) into equations (1.4) and (1.5), to get:

$$x_{11}(k) = \frac{x(k)}{2} \left(1 + j\sqrt{\frac{1 - \cos\phi(k)^2}{\cos\phi(k)^2}}\right)$$

and $$x_{12}(k) = \frac{x(k)}{2} \left(1 - j\sqrt{\frac{1 - \cos\phi(k)^2}{\cos\phi(k)^2}}\right)$$

The following steps prove the above equations are equal to equation (1.4) and (1.5). The above equations can be simplified as:

$$x_{11}(k) = \frac{x(k)}{\cos\phi(k)} \frac{(\cos\phi(k) + j\sin\phi(k))}{2} \quad (1.9)$$

and $$x_{12}(k) = \frac{x(k)}{\cos\phi(k)} \frac{(\cos\phi(k) - j\sin\phi(k))}{2} \quad (1.10)$$

An exponential function can be represented by the cosine and sine function as follows:

$$e^{j\phi(k)} = \frac{\cos(k) + j\sin\phi(k)}{2} \quad (1.11)$$

and $$e^{-j\phi(k)} = \frac{\cos(k) - j\sin\phi(k)}{2} \quad (1.12)$$

By replacing the equations (1.11) and (1.12) in equations (1.9) and (1.10), it is proved that equations (1.6) and (1.7) are equal to equations (1.4) and (1.5).

Referring still to FIG. 1, the higher layers 110*b*, . . . , 110*n* are each configured to perform further signal decomposition. Because each of the two signals received from the first layer 110*a* have a constant envelope, the second layer 110*b* to the nth layers 110*n* can also be configured to output decomposed signals that have a constant envelope, as described herein in greater detail.

Figure 2:
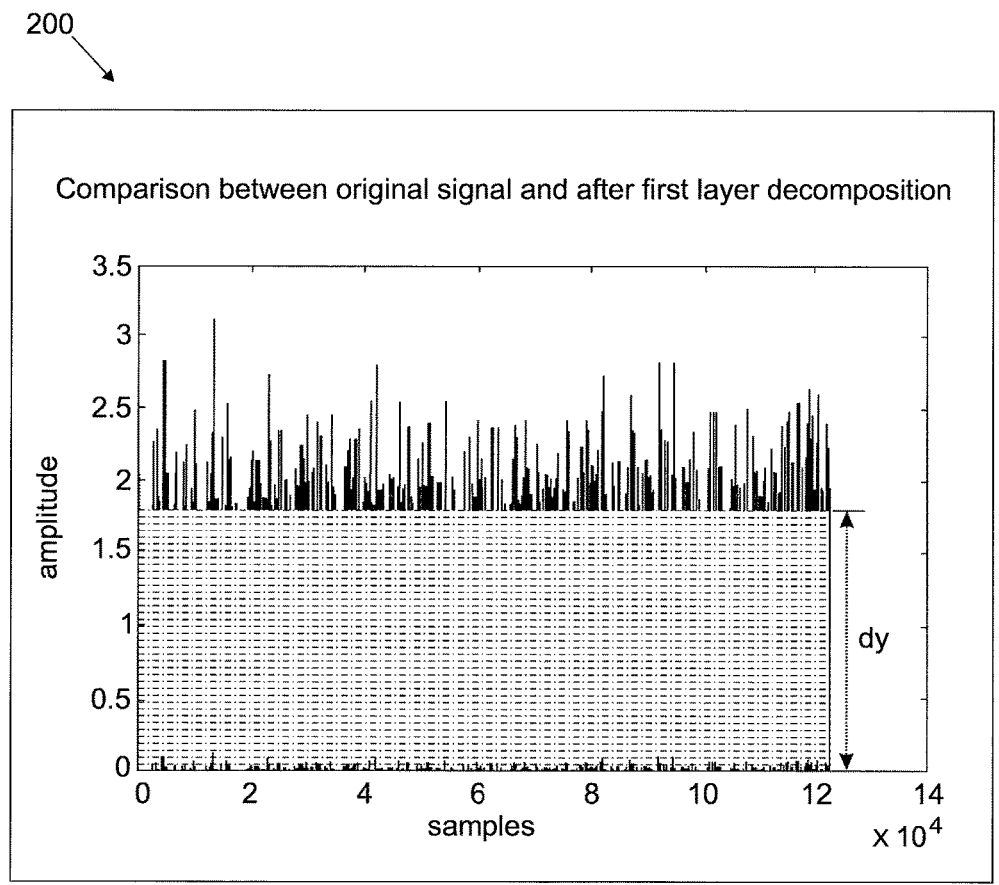
FIG. 2 illustrates a graph of an original input signal and a first layer decomposition.

Reference is made to FIG. 2, which illustrates a graph 200 of the original input signal 108 and an amplitude envelope value of the first layer 110*a*. The graph 200 is amplitude versus sample. The first layer 110*a* decomposition algorithm can be perfect decomposition into two constant envelope signals, that each have a signal amplitude dynamic range 'dy'. It is recognized herein that merely iterating this algorithm cannot further reduce signal amplitude dynamic range 'dy' shown in the graph 200. In example embodiments, a threshold algorithm is used to further decompose the two constant envelope signals, to further reduce dynamic range of each signal, without impact on or with minimal impact on each signal's envelope characteristics (e.g., maintain a small PAPR, maintain constant envelope).

The threshold algorithm of the second layer 110*b* to the nth layer 110*n* is used to further decompose the signal to reduce dynamic range and signal amplitude. The threshold algorithm is dependent on a threshold 'd', and is as follows:

$$x_1(k) = \begin{cases} 0 & |x(k)| < d \\ \frac{x(k)}{|x(k)|} \times d & d \le |x(k)| \end{cases} \quad (2.1)$$

and $$x_2(k) = \begin{cases} x(k) & |x(k)| < d \\ \left(1 - \frac{d}{|x(k)|}\right) \times x(k) & d \le |x(k)| \end{cases} \quad (2.2)$$

In an example embodiment, the value of is a predefined value within the range $0 < d < A_m$. $A_m$ is the maximum value of the amplitude of the original input signal 108.

In another example embodiment, the value of 'd' can be selected or programmed to target different amplitude values of the decomposed signal at each layer. After several layers, the signal amplitude can be reduced as shown in FIG. 3.

Figure 3:
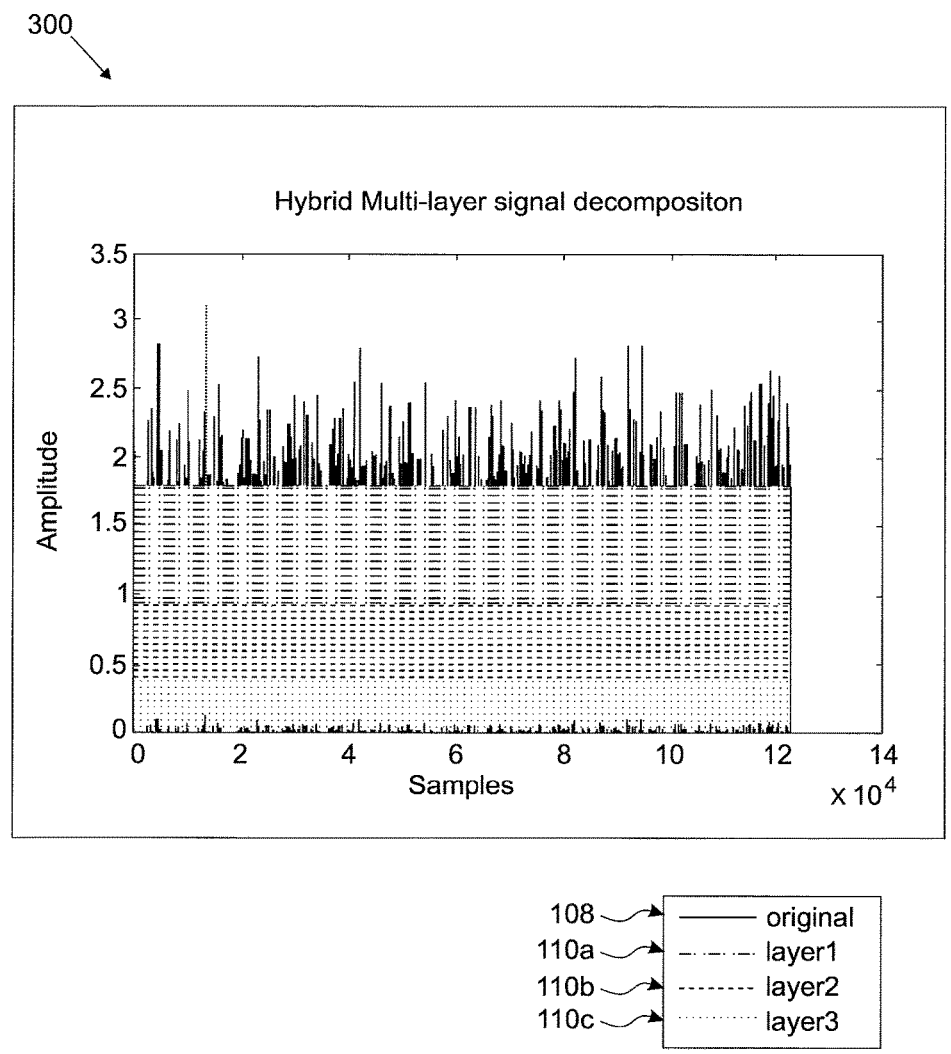
FIG. 3 illustrates a graph of the original input signal, the first layer decomposition, a second layer decomposition, and a third layer decomposition.

FIG. 3 illustrates a graph 300 of the original input signal 108 and an amplitude envelope value of the first layer 110*a*, the second layer 110*b*, and the third layer 110*c*. The graph 300 is similar to the graph 200 of FIG. 2 and further illustrates amplitude envelope values of the second layer 110b and the third layer 110c. As illustrated in FIG. 3, in an example embodiment of symmetrical decomposition, each 'd' value is calculated as a half amplitude of the input signal received from the previous layer. In another example embodiment, not shown, there is asymmetrical decomposition wherein 'd' is a value that is not half of the input signal received from the previous layer.

The same threshold algorithm is iteratively used at the second layer 110b and higher layers, in an example embodiment. The number of layers can be dependent on the system design requirements. The value of 'd' for each layer 110 can be selected as a value that is greater than zero and is less than a constant envelope amplitude value of the input signal(s) to the present layer 110.

Each layer 110 outputs a decomposed signal that has reduced dynamic range when compared to the input signal received from the previous layer 110. As well, the decomposed signal from each layer 110 can be represented using a lower number of quantization bits when compared to the input signal received from the previous layer 110.

Figure 4:
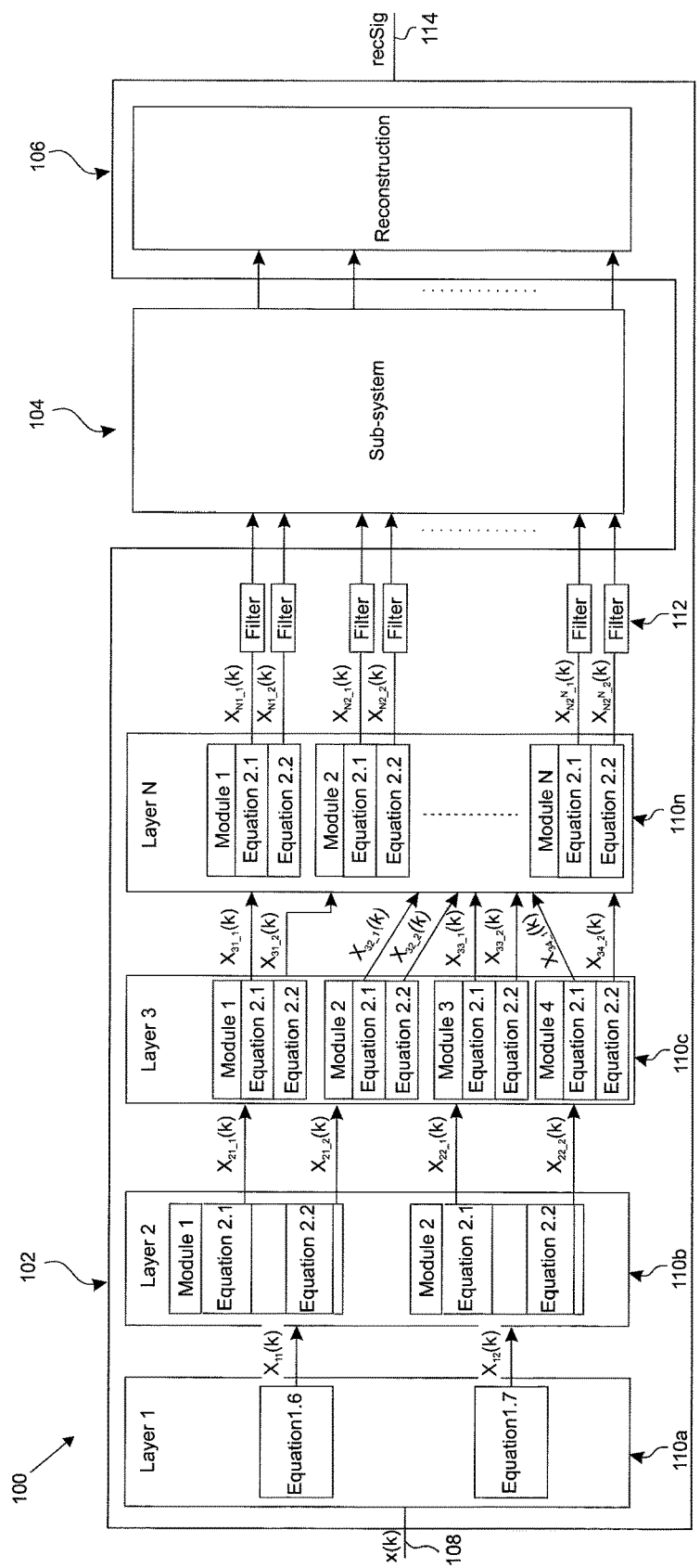
FIG. 4 illustrates a detailed block diagram of the signal processing system of FIG. 1, in accordance with an example embodiment.

Reference is now made to FIG. 4, which illustrates the system 100 in greater detail. The second layer 110b individually processes the two input signals received from the first layer 110a. The resultant output from decomposition performed by the second layer 110b is two output signals for each input signal, totaling four output signals. The second layer 110b decomposition can be defined using two identical function modules, in an example embodiment.

Referring still to FIG. 4, the second layer 110b, module 1 output signals are:

$$x_{21\_1}(k) = \begin{cases} 0 & |x_{11}(k)| < d \\ \frac{x_{11}(k)}{|x_{11}(k)|} \times d & d \leq |x_{11}(k)| \end{cases} \quad (2.3)$$

and $$x_{21\_2}(k) = \begin{cases} x_{11}(k) & |x_{11}(k)| < d \\ \left(1 - \frac{d}{|x_{11}(k)|}\right) \times x_{11}(k) & d \leq |x_{11}(k)| \end{cases} \quad (2.4)$$

The second layer 110b, module 2 output signals are:

$$x_{22\_1}(k) = \begin{cases} 0 & |x_{12}(k)| < d \\ \frac{x_{12}(k)}{|x_{12}(k)|} \times d & d \leq |x_{12}(k)| \end{cases} \quad (2.5)$$

and $$x_{22\_2}(k) = \begin{cases} x_{12}(k) & |x_{12}(k)| < d \\ \left(1 - \frac{d}{|x_{12}(k)|}\right) \times x_{12}(k) & d \leq |x_{12}(k)| \end{cases} \quad (2.6)$$

For layers higher than two, the principle is same. Each input signal is decomposed to two output signals.

For the subscript of x in FIG. 4, the first number indicates the layer, the second number indicates the module number or module ID for that layer, the third number indicates the branch for that module number. For example, for '$x_{31\_2}(k)$' shown in FIG. 4, the '3' represents signal output from the third layer 110c, the '1' represents the first module ("module 1") of the third layer 110c, and the '2' represents the second branch of module 1 of the third layer 110c.

The following demonstrates that there is maintained a constant amplitude envelope at each layer 110. For the second layer 110b, equation (1.4) is the signal input and can be inserted into equation (2.1) and (2.2) as follows:

$$x_{21\_1}(k) = \begin{cases} 0 & |x(k)| < d \\ \frac{\frac{A_m}{2}e^{j\phi(k)}e^{j\theta(k)}}{\frac{A_m}{2}} \times d & d \leq |x(k)| \end{cases} \quad (2.7)$$

and $$x_{21\_2}(k) = \begin{cases} \frac{A_m}{2}e^{j\phi(k)}e^{j\theta(k)} & |x(k)| < d \\ \left(1 - \frac{d}{\frac{A_m}{2}}\right) \times \frac{A_m}{2}e^{j\phi(k)}e^{j\theta(k)} & d \leq |x(k)| \end{cases} \quad (2.8)$$

The above equations can be simplified as:

$$x_{21\_1}(k) = \begin{cases} 0 & |x(k)| < d \\ d \times e^{j\phi(k)}e^{j\theta(k)} & d \leq |x(k)| \end{cases} \quad (2.9)$$

and $$x_{21\_2}(k) = \begin{cases} \frac{A_m}{2}e^{j\phi(k)}e^{j\theta(k)} & |x(k)| < d \\ \left(\frac{A_m}{2} - d\right) \times e^{j\phi(k)}e^{j\theta(k)} & d \leq |x(k)| \end{cases} \quad (2.10)$$

The signal maintains constant envelope properties, but reduces the dynamic range. It is possible to get the same results for the other branches and layers. The math equation mapping is shown in FIG. 4.

Figure 5:
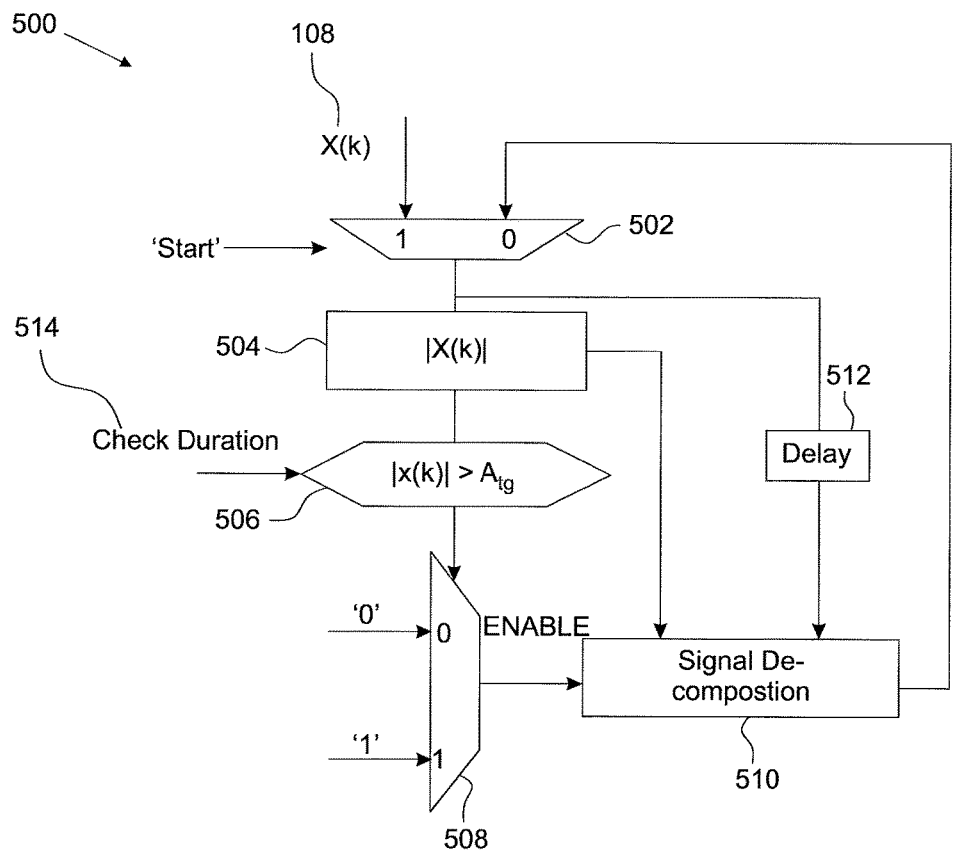
FIG. 5 illustrates a logic diagram of layer control for the signal processing system of FIG. 1, in accordance with an example embodiment.
Figure 6:
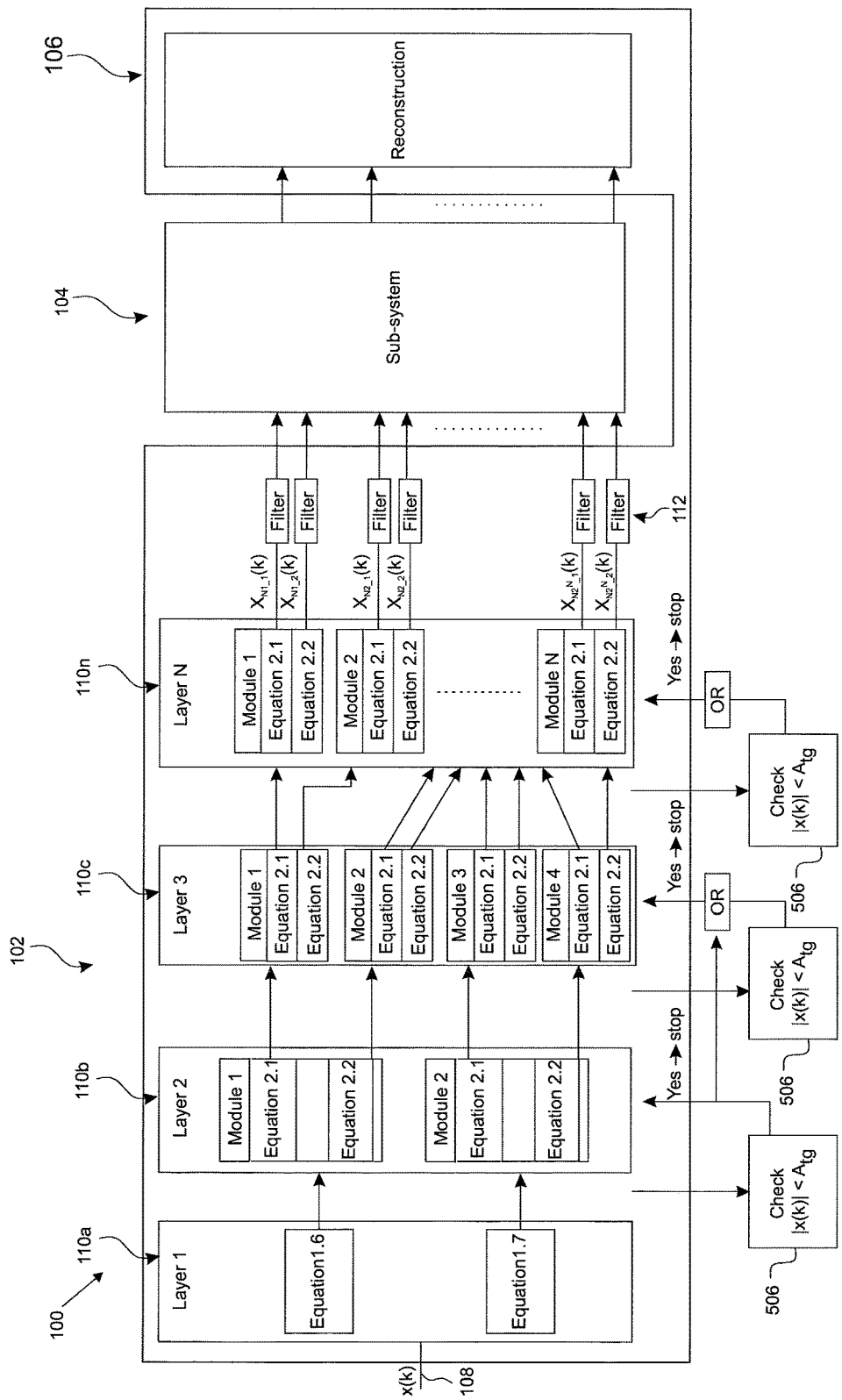
FIG. 6 illustrates a detailed block diagram for the signal processing system of FIG. 1, with implementation of the layer control of FIG. 5, in accordance with an example embodiment.

Reference is now made to FIGS. 5 and 6, which illustrate layer control of the system 100 in accordance with an example embodiment. FIG. 5 illustrates a logic diagram 500 of the layer control, and FIG. 6 illustrates the block diagram of the system 100 of FIG. 1 with implementation of the layer control. Decomposition of the source signal into further decomposed signals is iteratively performed until a specified condition is determined.

The number of layers can be controlled by the target dynamic range, $A_{tg}$. Block 502 receives the original input signal 108. Block 504 determines the constant amplitude of the envelope. Block 506 checks whether the constant amplitude is greater than the target dynamic range, $A_{tg}$, for a specified time period, $T_{tg}$ (event 514). If so, signal decomposition is performed by controlling block 508 to enable the signal decomposition block 510. If not, the method 500 ends and other processes may be performed on the finally decomposed signals, such as processes by the filters 112, by the sub-systems 104, etc. In an example embodiment, the delay 512 block causes a delay on the signal decomposition block 510. The signal decomposition block 510 loops back to block 502 and returns the outputs from the just completed layer 110, to perform a next iteration. The decomposition block 510 is configured to first perform layer 1 (110a), and then for subsequent iterations the decomposition block 510 performs the higher layers, from the second layer 110b to the nth layer 110n, for example. In an example embodiment, the finally decomposed signals that result from the nth layer 110n are then stored to a memory, or sent to further sub-systems for processing, transmission, and/or re-composition.

Referring to FIG. 6, by comparing (block 506) the input signal with the target $A_{tg}$, the signal decomposition (block 510) is stopped when the input |x(k)| is less or equal to the target $A_{tg}$. Both $A_{tg}$ and check duration 514 are design parameters that can be predefined, in some example embodiments. In other example embodiments, $A_{tg}$ and check duration 514 can be determined in real-time.

In an example embodiment, the signal decomposition (block 510) is stopped when the envelope amplitude value of any one of the output signals in a layer attains the target $A_{tg}$. For example, in the case of symmetrical decomposition, only one of the output signals needs to be compared to the target $A_{tg}$, because the remaining signals will have the same envelope amplitude value. In another example embodiment, the signal decomposition (block 510) is stopped when the envelope amplitude value of all of the output signals in a layer attains the target $A_{tg}$. For example, in the case of asymmetrical decomposition, all of the output signals may be compared the target $A_{tg}$, so that the signal decomposition (block 510) is stopped when the maximum amplitude value of all of the output signals is below the target.

Figure 7:
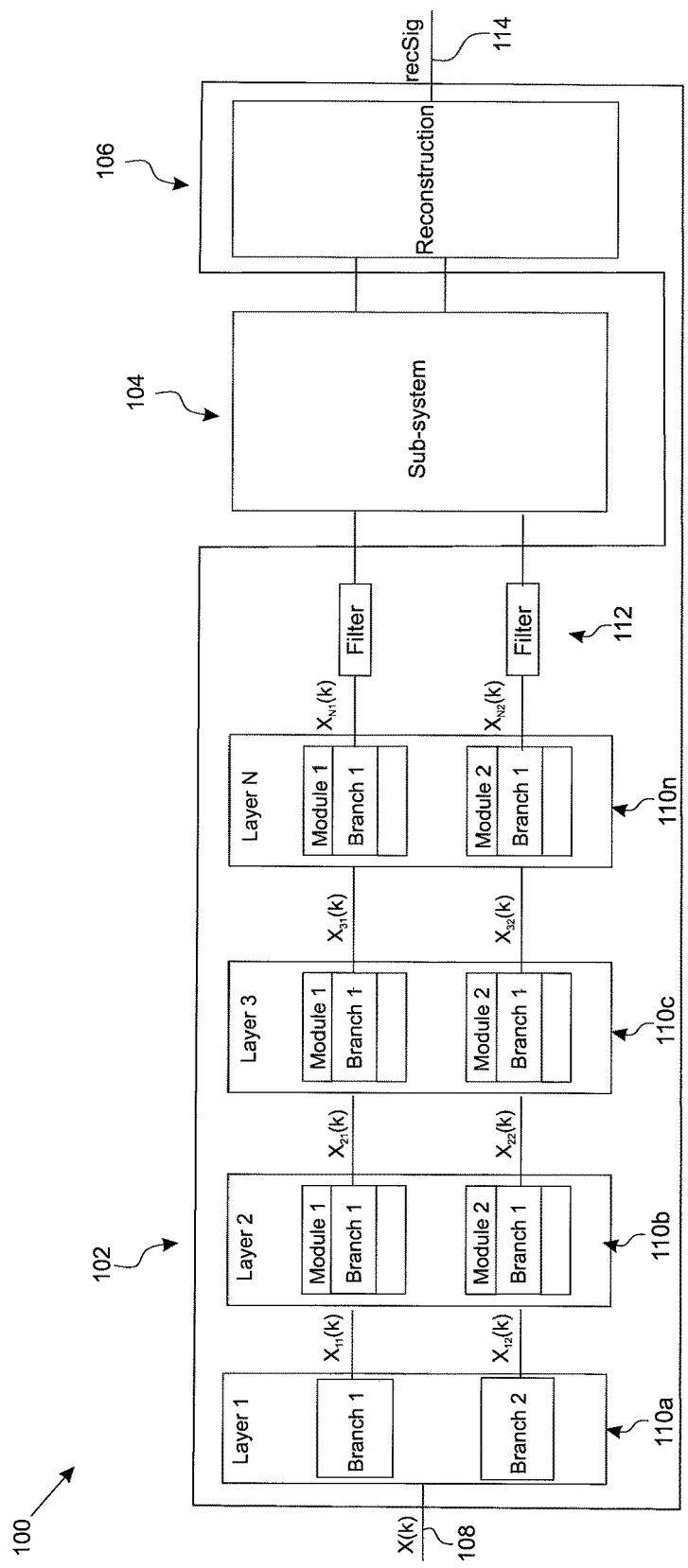
FIG. 7 illustrates a detailed block diagram of the signal processing system of FIG. 1 with symmetrical decomposition, in accordance with an example embodiment.

FIG. 7 illustrates the signal processing system 100 with resource reduction, in accordance with an example embodiment. By calculating a specific value at each layer, it may be possible to reduce resources by shutting down certain branches, for example one of the two branches at each module, when compared to the signal processing system 100 illustrated in FIG. 4.

To illustrate how certain branches can be shut down, the threshold is replaced by $A_m/2$ in equations (2.9) and (2.10).

$$x_{21\_1}(k) = \begin{cases} 0 & |x(k)| < d \\ \frac{A_m}{2}e^{j\phi(k)}e^{j\theta(k)} & d \le |x(k)| \end{cases} \quad (2.11)$$

and $$x_{21\_2}(k) = \begin{cases} \frac{A_m}{2}e^{j\phi(k)}e^{j\theta(k)} & |x(k)| < d \\ 0 & d \le |x(k)| \end{cases} \quad (2.12)$$

In the system 100 of FIG. 4, the second layer 110b, module 1 can be configured to calculate both $x_{21\_1}$ and $x_{21\_2}$. As can be seen from equations (2.11) and (2.12), $x_{21\_1}$ and $x_{21\_2}$ have a common component $$\text{``}\frac{A_m}{2}e^{j\phi(k)}e^{j\theta(k)}\text{''}$$

that only needs to be calculated once. Continuing the example, for the second layer 110b, at module 1, only $x_{21\_1}$ would be required to be calculated and stored to the memory. During reconstruction, $x_{21\_2}$ can be recovered using $x_{21\_1}$, using the common component $$\text{``}\frac{A_m}{2}e^{j\phi(k)}e^{j\theta(k)}\text{''}.$$

The result is that the system 100 can save approximately half of the computation resources.

The high-level block diagram of the resource reduction is shown in the system 100 shown in FIG. 7. Only one of equations (2.11) and (2.12) needs to be calculated, with the one output required to be processed and saved to memory. Therefore, this can reduce hardware or software resources without impact on the performance. In the system 100 of FIG. 7, for the second layer 110b to the nth layer 11n, only one decomposed output signal needs to calculated for each input signal. This contrasts with the implementation of the system 100 illustrated in FIG. 4 that has an exponential increase in decomposed output signals at each layer 110.

Figure 8:
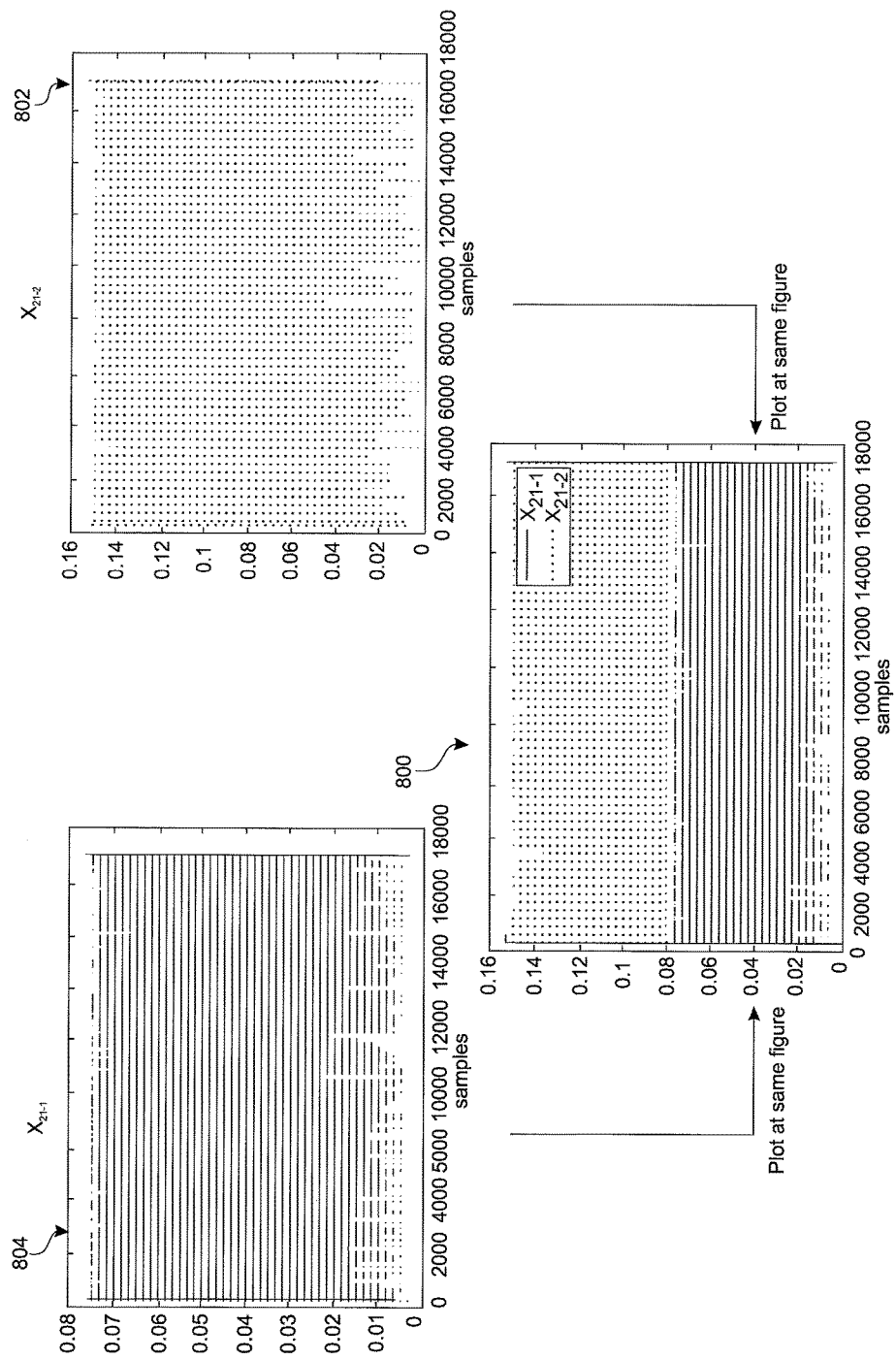
FIG. 8 illustrates a graph of simulation results of a first module of a second layer of the signal processing system of FIG. 1, in accordance with an example embodiment.

Reference is now made to FIG. 8, which illustrates a graph 800 of simulation results of the module 1 of the second layer 110b of the signal processing system 100. The threshold 'd' can be programmed to obtain different dynamic range of signals within the same layer, as shown in FIG. 8. The individual graphs of the first branch 802 and the second branch 804 are also illustrated.

Figure 9A:
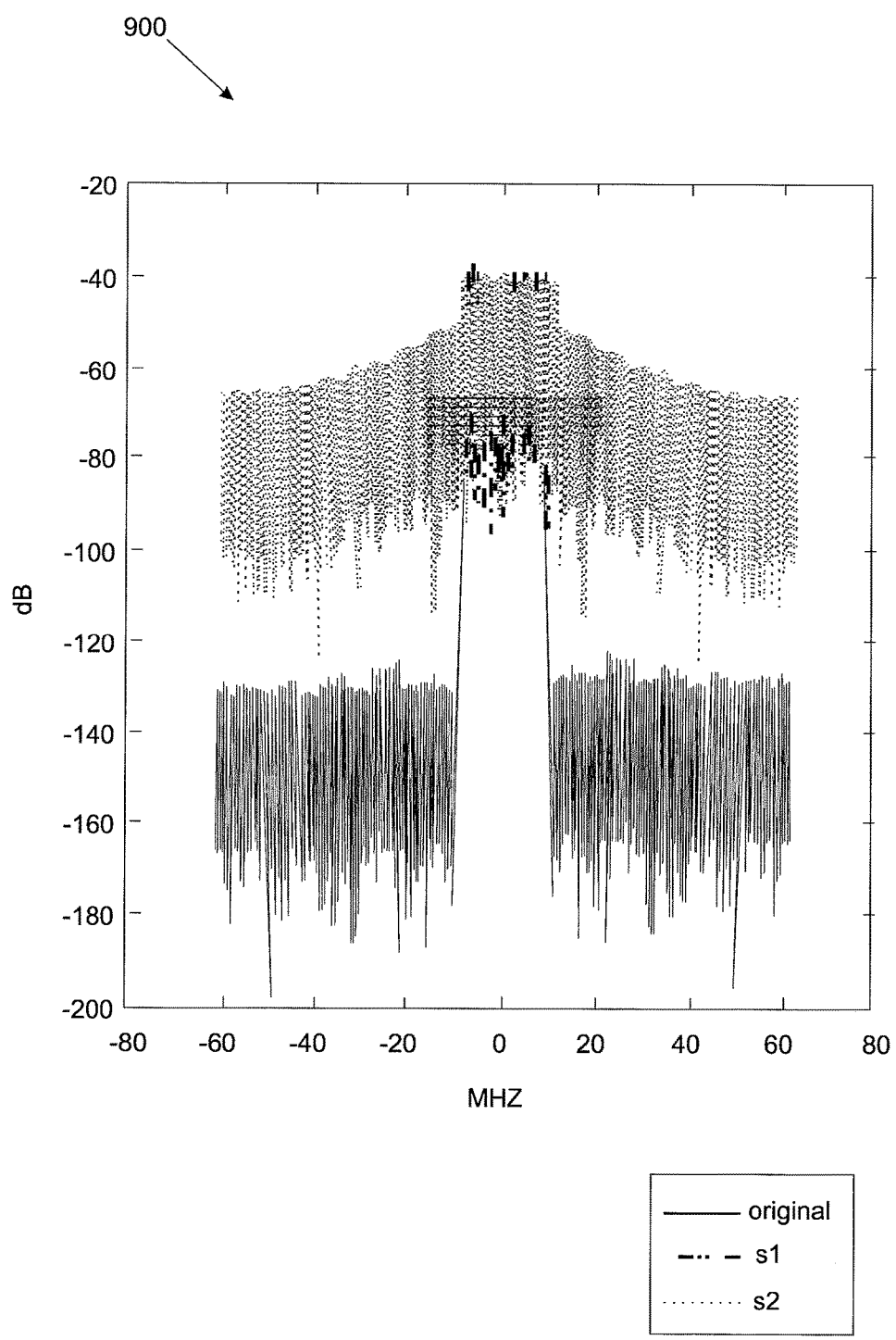
FIG. 9A illustrates a spectral graph of performance of a prior art system that has threshold decomposition only.
Figure 9B:
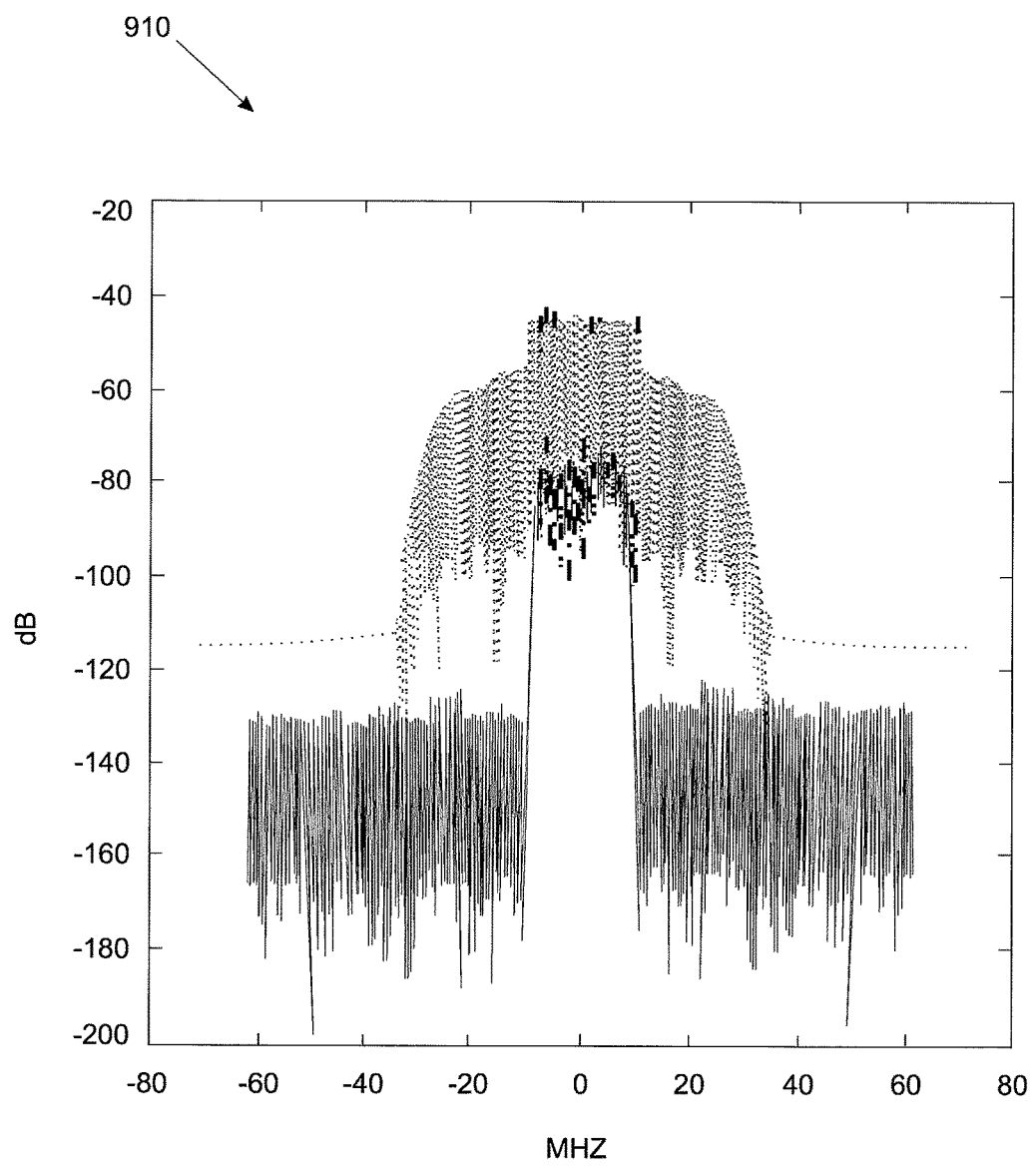
FIG. 9B illustrates a spectral graph of an original signal and first layer outputs of the signal processing system of FIG. 1, in accordance with an example embodiment.

FIG. 9A illustrates a spectral graph 900 of a prior art system that has threshold decomposition only. In other words, there is no initial constant envelope decomposing algorithm. The graph 900 shows the original signal as well as first and second outputs ('s1' or 's2', respectively). FIG. 9B illustrates a spectral graph 910 of the original signal and the first layer 110a signal outputs ('s1' or 's2', respectively), in accordance with an example embodiment. In the illustrated symmetrical cases, s1 and s2 generally overlap so appear as the same signal for illustration purposes.

As can be seen from the spectral graph 900, the bandwidth for s1 and s2 is narrower and more defined than the original signal, due to the constant amplitude envelope of s1 and s2. The bandwidth for the original signal is much wider.

Figure 10A:
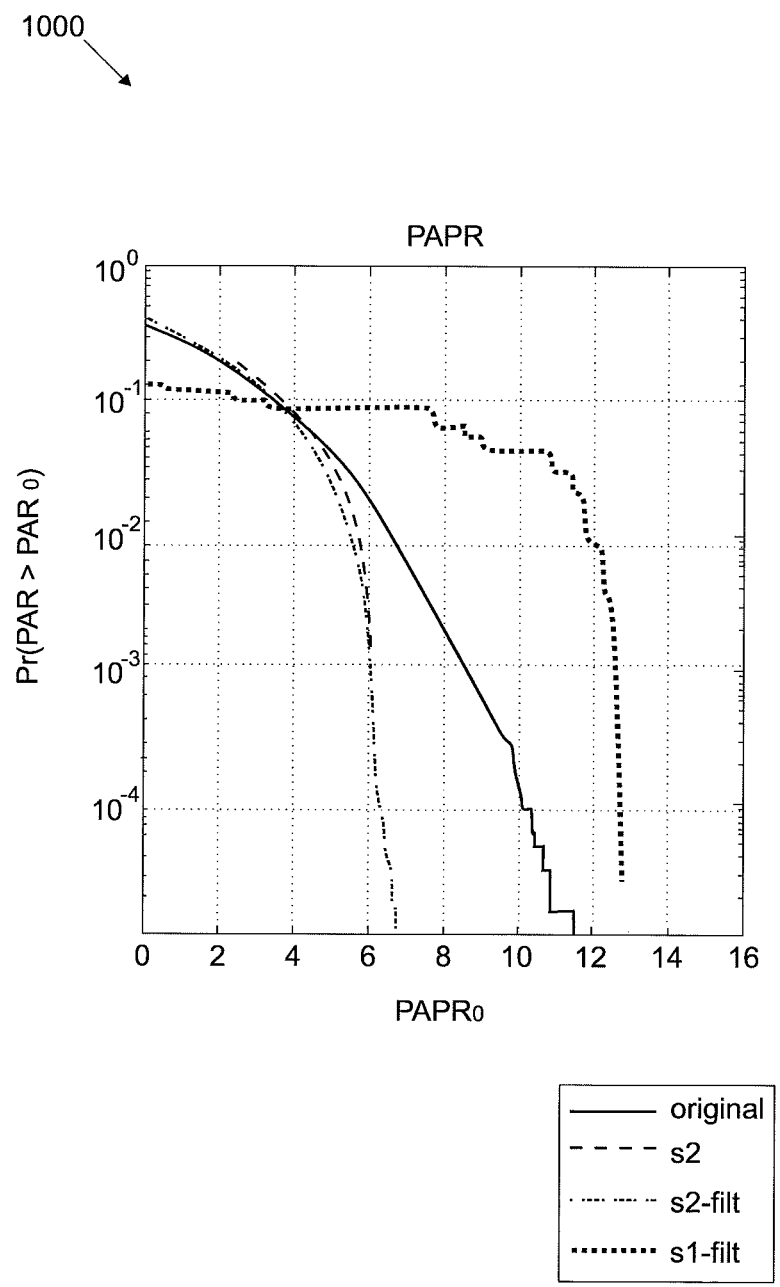
FIG. 10A illustrates a Peak-To-Average Power Ratio (PAPR) graph of performance of a prior art system that has threshold decomposition only.

FIG. 10A illustrates a Peak-to-Average Power Ratio (PAPR) graph 1000 of performance of the just-described prior art system of FIG. 9A that has threshold decomposition only. The X-axis is the PAPR of the 'original signal' (the input signal 108 of FIG. 1). The illustrated 'original signal' is used as a reference only for the X-axis. The Y-axis is the probability that the PAPR is greater than the reference original signal PAPR. Plotted against the Y-axis is the output from a second branch 's2' of the threshold decomposition only, a filtered output from the second branch 's2-filt' of the threshold decomposition only, and a filtered output from the first branch 's1-filt' of the threshold decomposition only.

Figure 10B:
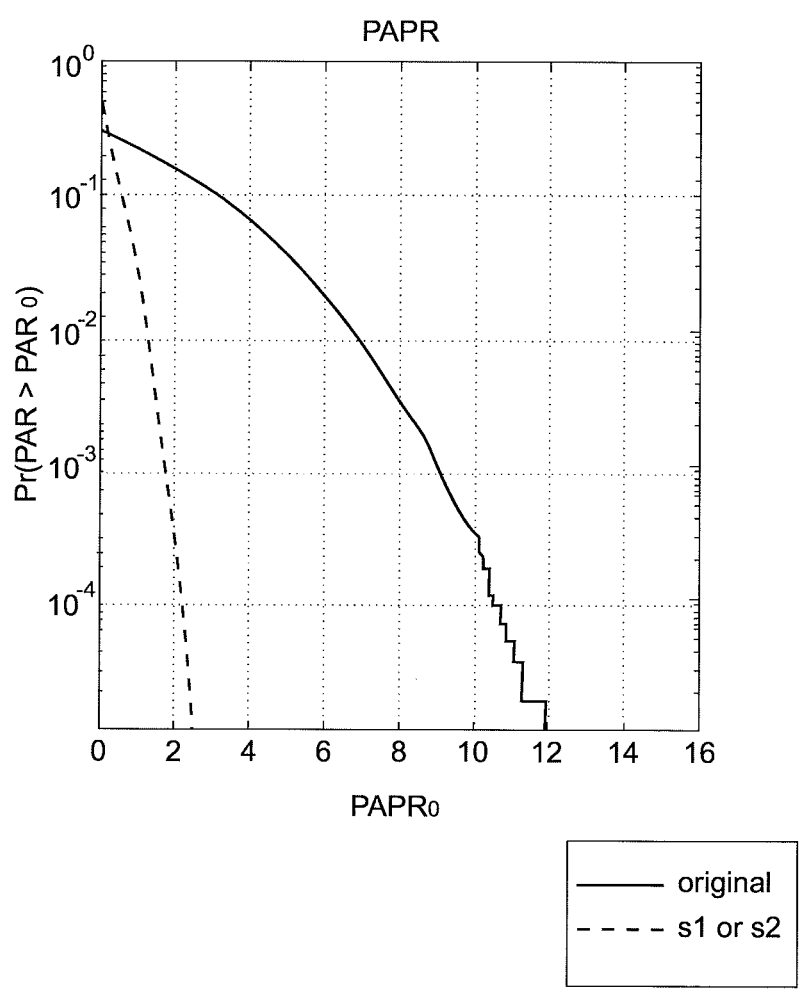
FIG. 10B illustrates a Peak-To-Average Power Ratio (PAPR) graph of performance of the signal processing system of FIG. 1, in accordance with an example embodiment.

FIG. 10B illustrates a Peak-To-Average Power Ratio (PAPR) graph 1010 of output from the signal processing system 100 of FIG. 1, in accordance with an example embodiment. The X-axis is the PAPR of the 'original signal' (the input signal 108 of FIG. 1). The illustrated original signal is used as a reference only for the X-axis. The Y-axis is the probability that the PAPR is greater than reference original signal PAPR. Plotted against the Y-axis is the output from 's1' and 's2'. In the illustrated symmetrical case, 's1' and 's2' generally overlap and so appear as the same signal. As shown in the graph 1010, the PAPR for s1 and s2 is generally lower when compared to the original signal, especially for higher PAPR of the original signal.

Figure 10C:
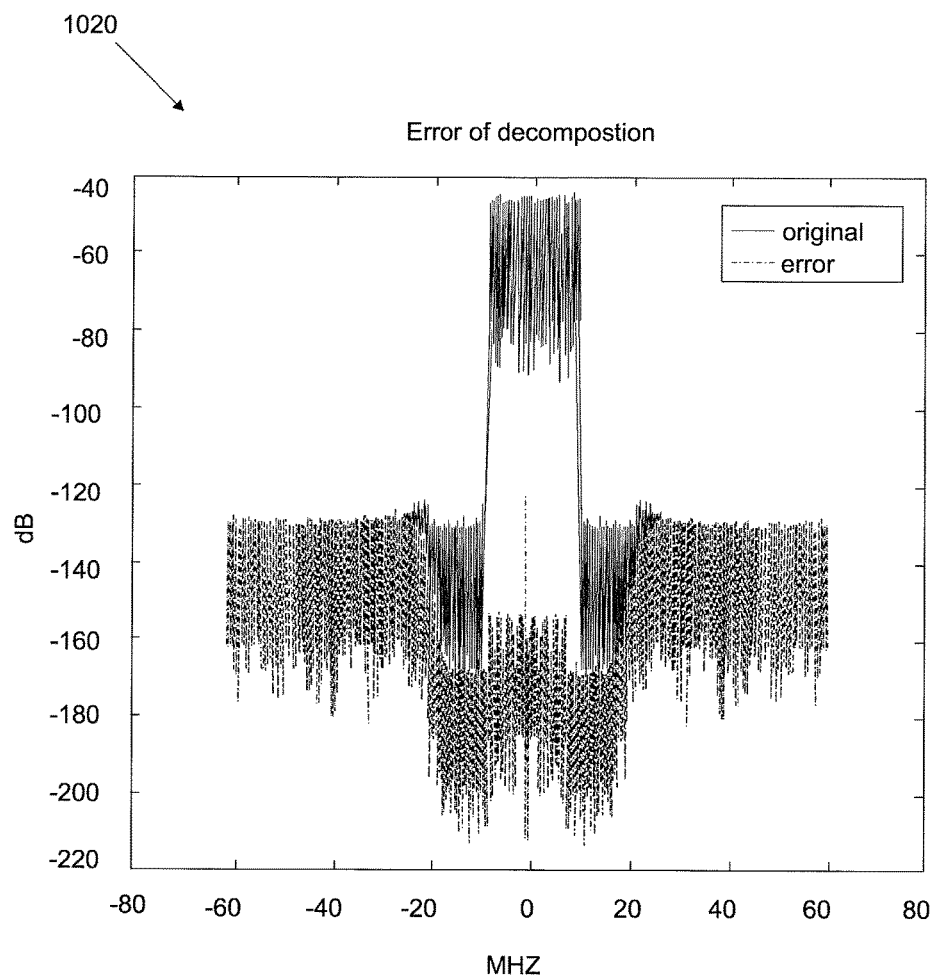
FIG. 10C illustrates a spectral graph of an error comparison of performance of the signal processing system of FIG. 1, in accordance with an example embodiment.

FIG. 10C illustrates a spectral graph 1020 of an error comparison of the decomposition module 102. Shown is the original signal, as well as the error due to the decomposition of the decomposition module 102 versus the original signal, in decibels (dB) versus frequency (MHz).

The following table summarizes simulation results of the prior art Threshold Decomposition Only system versus simulation results of performance of the decomposition module 102.

TABLE 1

| Threshold Decomposition Only | | | Decomposition Module 102 | | |
|---|---|---|---|---|---|
| Quantization Bit | | | Quantization Bit | | |
| s1 | s2 | Average EVM, % | s1 | s3 | Average EVM, % |
| Float | Float | 1.042 | Float | Float | 1.042 |
| 13 | 13 | 1.041 | | | |
| 10 | 10 | 1.055 | 10 | 10 | 1.06 |
| | | | 9 | 9 | 1.27 |
| 8 | 8 | 1.257 | | | |
| 10 | 8 | 1.16 | | | |
| 8 | 10 | 1.16 | | | |
| 7 | 7 | 1.7 | 7 | 7 | 1.25 |
| 7 | 8 | 1.49 | 7 | 8 | 1.18 |
| 8 | 7 | 1.5 | 8 | 7 | 1.18 |
| 7 | 6 | 2.39 | | | |
| 6 | 7 | 2.39 | | | |
| 6 | 6 | 2.93 | 6 | 6 | 1.7 |
| | | | 5 | 5 | 2.9 |

In Table 1, the "Quantization Bit" refers to a number of bits that are used to represent the respective decomposed signal, and the "Average error vector magnitude (EVM), %" represents the departure from the original signal for the particular set of Quantization Bits. In Table 1, blank entries mean that the simulation did not have exact Quantization Bit values that exactly correspond to a particular set of Quantization Bits.

In Table 1, the Threshold Decomposition Only results in the two decomposed signals, indicated as 's1' and 's2'. Referring to FIG. 4 and Table 1, for the decomposition module 102, 's1' refers to $x_{21\_1}(k)$, 's2' refers to $x_{21\_3}(k)$, 's3' refers to $x_{22\_1}(k)$, and 's4' refers to $x_{22\_2}(k)$. In Table 1, the decomposition module 102 also represents the symmetrical decomposition case. Therefore, the results shown in Table 1 are only for decomposed signals 's1' and 's3'. Note that 's2' and 's4' (not shown) do not need to be represented by quantization bits in this symmetrical decomposition case because they can be subsequently recovered from 's1' and 's3' respectively, as outlined above in relation to equations (2.11) and (2.12).

As can be seen from Table 1, at the higher Quantization Bit values such as "Float" and "10", the decomposition module 102 has comparable performance to Threshold Decomposition Only. At lower Quantization Bit values, the decomposition module 102 performs better than Threshold Decomposition Only with respect to the EVM. For example, at Quantization Bit of '6', the EVM percentage from Threshold Decomposition Only is 2.94, and the EVM percentage from the decomposition module 102 is 1.7.

A similar conclusion from Table 1 is that, to achieve a similar EVM, the decomposition module 102 generally requires fewer Quantization Bits when compared to the Threshold Decomposition Only, especially at the lower Quantization Bit values.

Referring again to FIG. 1, the subsystem 104 only receives the final decomposed signals, which have e.g. reduced dynamic range and constrained bandwidth when compared to the original signal 108. These properties of the final decomposed signals can improve the performance of the subsystem(s) 104.

Figure 11:
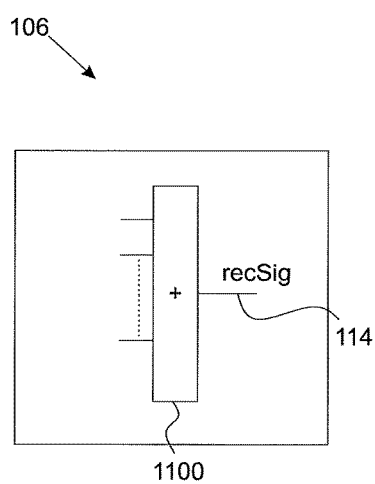
FIG. 11 illustrates a block diagram of an example reconstruction module of the signal processing system of FIG. 1, in accordance with an example embodiment.

FIG. 11 illustrates a block diagram of the reconstruction module 106, in accordance with an example embodiment. In an example embodiment, the reconstruction module 106 is configured to reconstruct or re-compose the received signals from the one or more subsystems 104, for example by performing the functions of the decomposition module 102 in reverse. A recovered signal 114 therefore results from the reconstruction module 106. The reconstruction module 106 comprises an addition module 110.

For example, in FIG. 4 a plurality of decomposed signals may be output from the nth layer 110n. In FIG. 11, those plurality of decomposed signals are received as a plurality of input signals by the addition module 1100. The addition module 1100 is configured to generate the recovered signal 114, for example by adding the received plurality of input signals together.

Figure 12:
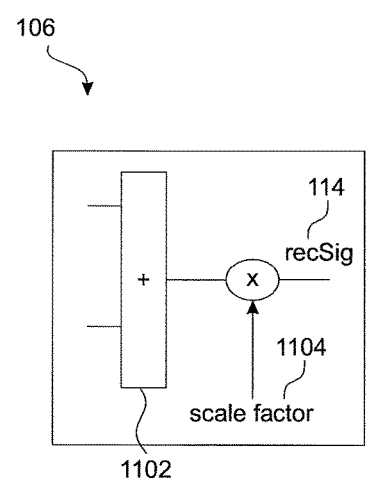
FIG. 12 illustrates a block diagram of another example reconstruction module in the case of symmetrical decomposition, for the signal processing system of FIG. 1, in accordance with another example embodiment.

FIG. 12 illustrates a block diagram of the reconstruction module 106 in the case of symmetrical decomposition, in accordance with an example embodiment. The reconstruction module 106 of FIG. 12 is used for the case of reconstructing the decomposed signals that are output due to symmetrical decomposition, as in the case of the system 100 of FIG. 7. As indicated at addition module 1102, the reconstruction module 106 is only required to receive exactly two input signals (the two input signals correspond to the two main output signals from the system 100 of FIG. 7). The addition module 1102 adds the two input signals together. A scale factor 1104 is also applied at module 1102, which can be a pre-defined scale factor in an example embodiment. The addition module 1102 in FIG. 12 does not need to receive more than the two main input signals, as compared to the case of the addition module 1100 in FIG. 11 that receives more than two input signals.

Referring to FIG. 1, in an example embodiment, the number of layers 110 may vary. Successive decompositions are performed until the decomposed signals reach the target amplitude, $A_{tg}$. In an example embodiment, there is real-time automatic layer control to determine the number of layers. In an example embodiment, signal decomposition is stopped when the input signal reaches $Ix'<A_{tg}$ for a certain period, $T_{tg}$. In another example embodiment, the number of layers can be predefined.

It may be appreciated that threshold 'd' can be selected to be any value between zero and $A_m$. The system 100 can be used to produce either symmetric or asymmetric decomposition signal in example embodiments.

As well, the hybrid multi-layer architecture enables the use of one or more filters 112 in example embodiments, such as low pass filters or band pass filters, without causing significant PAPR degradation.

In example embodiments, the signal decomposition can improve system dynamic range or power efficiency for the subsystems 104, such as for LInear amplification using Nonlinear Components (LINC) Power Amplifiers (PA).

In an example embodiment, the decomposed signal has reduced bandwidth expansion. The limited bandwidth can result in a decomposition signal of less than 3 dB PAPR, for example.

In an example embodiment, the system 100 is implemented by a personal basic service set (PBSS) control point (PCP), an access point (AP) or a station (STA), as understood in the art.

In an example embodiment, at least one of the modules of the system 100 is implemented by an electronic component. For example, the decomposition module 102 can be implemented by a decomposition module electronic component. The electronic component may be provided as a semiconductor circuit, for example forming part or all of an integrated circuit package. The circuitry may be digital circuitry or analog circuitry. In some embodiments, the circuitry is preconfigured according to a specified number of layers, a specified threshold 'd', a specified time period to process a particular source signal, or other specified thresholds, etc. In other embodiments, the circuitry is reconfigurable and reprogrammable via a control interface or user interface.

Some example embodiments are applied for signal processing in millimeter wave (mmWave) wireless communication systems. Some example embodiments are applicable to signal processing in Wi-Fi™ communication systems, as specified in the IEEE 802.11 series of standards. It will be readily appreciated that example embodiments may be applied to other wireless communication systems, as well as to wired or optical systems, and in other communication environments.

Some example embodiments are applied for signal processing in single channel systems, multiple channel systems, beamforming, multiple channel systems, Multiple-Input-Multiple-Output (MIMO) systems, massive MIMO systems, multiple channel systems, or multicarrier systems. Some example embodiments may be applied to wired or wireless systems, including 4G, and are intended to cover and embrace higher generation systems including 5G.

Through the descriptions of the preceding example embodiments, the example embodiments may be implemented by using hardware only or by using software and a necessary universal hardware platform. Based on such understandings, the technical solution of the example embodiments may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the example embodiments. For example, such an execution may correspond to a simulation of the logical operations as described herein. The software product may additionally or alternatively include number of instructions that enable a computer device to execute operations for configuring or programming a digital logic apparatus in accordance with example embodiments.

Example apparatuses and methods described herein, in accordance with example embodiments, can be implemented by one or more controllers. The controllers can comprise hardware, software, or a combination of hardware and software, depending on the particular application, component or function. In some example embodiments, the one or more controllers can include analog or digital components, and can include one or more processors, one or more non-transitory storage mediums such as memory storing instructions executable by the one or more processors, one or more transceivers (or separate transmitters and receivers), one or more signal processors (analog and/or digital), and/or one or more analog circuit components.

In the described methods or block diagrams, the boxes may represent events, steps, functions, processes, modules, messages, and/or state-based operations, etc. Although some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The example embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The specification and drawings are, accordingly, to be regarded simply as an illustration, and are contemplated to cover any and all modifications, variations, combinations or equivalents.

What is claimed is:

1. A method for decomposition of a source signal, the method comprising:
   decomposing the source signal into two first-stage decomposed signals that each have a constant envelope amplitude value that is half of a maximum amplitude value of the source signal; and
   decomposing each of the first-stage decomposed signals into a first second-stage decomposed signal and a second second-stage decomposed signal that each have a constant envelope, a constant envelope amplitude value of each first second-stage decomposed signal being equal to a threshold amplitude value, a constant envelope amplitude value of each second second-stage decomposed signal being equal to the constant envelope amplitude value of one of the first-stage decomposed signals minus the threshold amplitude value.

2. The method as claimed in claim 1, wherein the threshold amplitude value is a predefined value.

3. The method as claimed in claim 1, wherein the threshold amplitude value is half of the maximum amplitude value of any one of the two first-stage decomposed signals.

4. The method as claimed in claim 1, wherein the source signal is represented as x(k) for each sample value k, wherein the two first-stage decomposed signals are:

$$x_{11}(k) = \frac{A_m}{2} e^{j\phi(k)} e^{j\theta(k)},$$

and $$x_{12}(k) = \frac{A_m}{2} e^{-j\phi(k)} e^{j\theta(k)};$$

wherein $A_m$ is the maximum amplitude value of the source signal, $\phi(k)$ and $\theta(k)$ are functions of k, e is Exponential function, and j is a unit imaginary number.

5. The method as claimed in claim 1, wherein the two first-stage decomposed signals are:

$$x_{11}(k) = \frac{x(k)+e(k)}{2},$$

and $$x_{12}(k) = \frac{x(k)-e(k)}{2};$$

wherein the source signal is represented as x(k) for each sample value k, and e(k) is an error function.

6. The method as claimed in claim 1, wherein each first second-stage decomposed signal and each second second-stage decomposed signal are:

$$x_1(k) = \begin{cases} 0 & |x(k)| < d \\ \frac{x(k)}{|x(k)|} \times d & d \le |x(k)| \end{cases},$$

and $$x_2(k) = \begin{cases} x(k) & |x(k)| < d \\ \left(1 - \frac{d}{|x(k)|}\right) \times x(k) & d \le |x(k)| \end{cases};$$

wherein the source signal is represented as x(k) for each sample value k, and d is the threshold amplitude value.

7. The method as claimed in claim 6, wherein d is half of the maximum amplitude value of one of the two constant first-stage decomposed signals, wherein the first second-stage decomposed signal and the second second-stage decomposed signal that are decomposed from one of the two first-stage decomposed signals are:

$$x_{21\_1}(k) = \begin{cases} 0 & |x(k)| < d \\ \frac{A_m}{2} e^{j\phi(k)} e^{j\theta(k)} & d \le |x(k)| \end{cases},$$

and $$x_{21\_2}(k) = \begin{cases} \frac{A_m}{2} e^{j\phi(k)} e^{j\theta(k)} & |x(k)| < d \\ 0 & d \le |x(k)| \end{cases};$$

wherein e is Exponential function.

8. The method as claimed in claim 1, wherein the source signal is represented as x(k) for each sample value k, wherein the first second-stage decomposed signal and the second second-stage decomposed signal that are decomposed from one of the two first-stage decomposed signals are:

$$x_{21\_1}(k) = \begin{cases} 0 & |x(k)| < d \\ d \times e^{j\phi(k)} e^{j\theta(k)} & d \le |x(k)| \end{cases},$$

and $$x_{21\_2}(k) = \begin{cases} \frac{A_m}{2} e^{j\phi(k)} e^{j\theta(k)} & |x(k)| < d \\ \left(\frac{A_m}{2} - d\right) \times e^{j\phi(k)} e^{j\theta(k)} & d \le |x(k)| \end{cases};$$

wherein d is the threshold amplitude value, $A_m$ is the maximum amplitude value of the source signal, $\phi$ and $\theta$ are functions of k, e is Exponential function, and j is a unit imaginary number.

9. The method as claimed in claim 1, further comprising:
iteratively performing at least one further stage of decomposition, on each of the second-stage decomposed signals as input signals, as follows:
determining a threshold amplitude value for a present stage of decomposition, and
decomposing the input signal into first and second present-stage decomposed signals that each have a constant envelope, a constant envelope amplitude value of the first output signal being equal to the threshold amplitude value for the present stage of decomposition, a constant envelope amplitude value of the second output signal being equal to the constant envelope amplitude value of the input signal minus the threshold amplitude value for the present stage of decomposition.

10. The method as claimed in claim 9, further comprising determining that the constant envelope amplitude value of any one of the output signals has attained a predetermined value, and in response to said determining ending the iteratively performing.

11. The method as claimed in claim 10, wherein the iteratively performing is ended when the constant envelope amplitude value of all of the output signals have attained the predetermined value.

12. The method as claimed in claim 9, further comprising determining that a predetermined number of stages of decomposition have been performed by the iteratively performing, and in response to said determining ending the iteratively performing.

13. The method as claimed in claim 9, further comprising determining that a predetermined time period has passed, and in response to said determining ending the iteratively performing.

14. The method as claimed in claim 9, wherein the threshold amplitude value for each stage of decomposition is half of a constant envelope amplitude envelope value of one of the input signals.

15. The method as claimed in claim 9, wherein the threshold amplitude value for each stage of decomposition is less than a constant envelope amplitude envelope value of one of the input signals.

16. The method as claimed in claim 1, further comprising filtering, using at least one filter, each of the second-stage decomposed signals.

17. The method as claimed in claim 16, wherein the at least one filter comprises at least one low pass filter or at least one band pass filter.

18. The method as claimed in claim 1, further comprising sending each of the second-stage decomposed signals to at least one subsystem, the at least one subsystem comprising a power amplifier, a Digital-To-Analog Converter (DAC), a transmitter, or a transmission line.

19. The method as claimed in claim 1, further comprising storing the further constant envelope signals to a memory.

20. The method as claimed in claim 1, wherein the threshold amplitude value is less than the maximum amplitude value of the two first-stage decomposed signals.

21. A method performed by a device for decomposition of a source signal, the method comprising:
 decomposing the source signal into two first-stage decomposed signals that each have a constant envelope amplitude value that is half of a maximum amplitude value of the source signal; and
 decomposing each of the two first-stage decomposed signals into a second-stage decomposed signal that has a constant envelope, a constant envelope amplitude value of each second-stage decomposed signal being equal to half of the maximum amplitude value of one of the first-stage decomposed signals, the source signal being recoverable from the second-stage decomposed signals.

22. The method as claimed in claim 21, wherein the source signal is represented as x(k) for each sample value k, wherein the second-stage decomposed signal from one of the first-stage decomposed signals is:

$$x_{21\_1}(k) = \begin{cases} 0 & |x(k)| < d \\ \frac{A_m}{2}e^{j\phi(k)}e^{j\theta(k)} & d \le |x(k)| \end{cases},$$

and $$x_{21\_2}(k) = \begin{cases} \frac{A_m}{2}e^{j\phi(k)}e^{j\theta(k)} & |x(k)| < d \\ 0 & d \le |x(k)| \end{cases};$$

wherein $A_m$ is the maximum amplitude value of the source signal, $\phi$ and $\theta$ are functions of k, e is Exponential function, and j is a unit imaginary number.

23. The method as claimed in claim 21, wherein the source signal is represented as x(k) for each sample value k, wherein the two first-stage decomposed signals are:

$$x_{11}(k) = \frac{A_m}{2}e^{j\phi(k)}e^{j\theta(k)},$$

and $$x_{12}(k) = \frac{A_m}{2}e^{-j\phi(k)}e^{j\theta(k)};$$

wherein $A_m$ is the maximum amplitude value of the source signal, $\phi$ and $\theta$ are functions of k, e is Exponential function, and j is a unit imaginary number.

24. The method as claimed in claim 21, further comprising storing each second-stage decomposed signal to a memory.

25. The method as claimed in claim 21, wherein each of the two first-stage decomposed signals are decomposed into only one respective second-stage decomposed signal.

26. A device for decomposition of a source signal, the device comprising:
 at least one controller configured to:
 decompose the source signal into two first-stage decomposed signals that each have a constant envelope amplitude value that is half of a maximum amplitude value of the source signal, and
 decompose each of the first-stage decomposed signals into a first second-stage decomposed signal and a second second-stage decomposed signal that each have a constant envelope, a constant envelope amplitude value of each first second-stage decomposed signal being equal to a threshold amplitude value, a constant envelope amplitude value of each second second-stage decomposed signal being equal to the constant envelope amplitude value of one of the first-stage decomposed signals minus the threshold amplitude value.

27. The device as claimed in claim 26, further comprising a receiver for receiving the source signal.

28. A non-transitory computer readable medium containing instructions for decomposition of a source signal, the non-transitory computer readable medium comprising instructions executable by a processor of a communication device for:
 decomposing the source signal into two first-stage decomposed signals that each have a constant envelope amplitude value that is half of a maximum amplitude value of the source signal; and
 decomposing each of the first-stage decomposed signals into a first second-stage decomposed signal and a second second-stage decomposed signal that each have a constant envelope, a constant envelope amplitude value of each first second-stage decomposed signal being equal to a threshold amplitude value, a constant envelope amplitude value of each second second-stage decomposed signal being equal to the constant envelope amplitude value of one of the first-stage decomposed signals minus the threshold amplitude value.

* * * * *